(12) United States Patent
Flaugher (10) Patent No.: US 7,709,138 B2
(45) Date of Patent: May 4, 2010

(54) LOW PROFILE INSULATED BATTERY ENCLOSURE INCORPORATING A STEP/WORK SURFACE

(76) Inventor: David J. Flaugher, 6112 Wilkinsburg, Raleigh, NC (US) 27609

( * ) Notice: Subject to any disclaimer, the term of this patent is extended or adjusted under 35 U.S.C. 154(b) by 416 days.

(21) Appl. No.: 11/472,173

(22) Filed: Jun. 21, 2006

(65) Prior Publication Data

US 2006/0286442 A1 Dec. 21, 2006

Related U.S. Application Data

(60) Provisional application No. 60/692,628, filed on Jun. 21, 2005.

(51) Int. Cl.
*H01M 2/10* (2006.01)

(52) U.S. Cl. .................. 429/126; 429/99; 429/100; 206/703

(58) Field of Classification Search .............. 429/124; 206/703

See application file for complete search history.

(56) References Cited

U.S. PATENT DOCUMENTS

| | | | |
|---|---|---|---|
| 3,912,348 A | 10/1975 | Seymour | |
| 3,983,952 A | 10/1976 | McKee | |
| 4,108,266 A | 8/1978 | Wojtyna | |
| 4,119,769 A * | 10/1978 | Schneider et al. | 429/112 |
| 4,278,742 A * | 7/1981 | Oxenreider et al. | 429/88 |
| 4,994,940 A | 2/1991 | Thouvenin et al. | |
| 5,140,744 A | 8/1992 | Miller | |
| 5,165,770 A | 11/1992 | Hahn | |
| 5,198,638 A | 3/1993 | Massacesi | |
| 5,304,434 A | 4/1994 | Stone | |
| 5,756,227 A | 5/1998 | Suzuki et al. | |
| 5,800,942 A | 9/1998 | Hamada et al. | |
| 5,806,948 A * | 9/1998 | Rowan et al. | 312/293.3 |
| 6,066,042 A * | 5/2000 | Oravetz | 454/237 |
| 6,123,266 A | 9/2000 | Bainbridge et al. | |
| 6,294,721 B1 | 9/2001 | Oravetz et al. | |
| 6,841,293 B1 * | 1/2005 | Dreulle et al. | 429/99 |
| 6,932,443 B1 * | 8/2005 | Kaplan et al. | 312/213 |
| 7,548,429 B2 * | 6/2009 | Miller | 361/724 |
| 2002/0005216 A1 | 1/2002 | Oravetz et al. | |
| 2005/0056473 A1 | 3/2005 | Damon | |
| 2005/0170238 A1 | 8/2005 | Abu-Isa et al. | |
| 2005/0214636 A1 | 9/2005 | Li | |
| 2006/0078786 A1 | 4/2006 | Wu | |

* cited by examiner

*Primary Examiner*—Dah-Wei D Yuan
*Assistant Examiner*—Patricia Davis
(74) *Attorney, Agent, or Firm*—Sutherland Asbill & Brennan LLP (57) ABSTRACT

A battery enclosure that includes a bottom portion configured to house a battery array and a top portion that is configured to rest on the bottom portion and enclose the battery array. The top portion of the battery enclosure is configured to be at least partially supported by the battery array when a load is placed on the top portion.

10 Claims, 3 Drawing Sheets

LOW PROFILE INSULATED BATTERY ENCLOSURE INCORPORATING A STEP/WORK SURFACE

CROSS REFERENCE TO RELATED APPLICATIONS

This application claims priority from U.S. Provisional Application No. 60/692,628, LOW PROFILE INSULATED BATTERY ENCLOSURE INCORPORATING A STEP/WORK SURFACE, which was filed on Jun. 21, 2005, and is incorporated herein by reference.

FIELD OF THE INVENTION

The present invention relates generally to a battery enclosure, and more specifically to a battery enclosure used in close proximity to an equipment housing.

BACKGROUND OF THE INVENTION

Telecommunications remote sites, utility switchgear sites, wireless sites and railroad sites all typically have electronic cabinets located in an outdoor environment. The equipment housed in these electronic cabinets frequently includes a battery back up that is used in the event of a utility power failure.

Batteries in such an environment are typically housed in the electronic cabinets themselves. While in operation, the equipment in the electronic cabinets generates heat that raises the ambient temperature of the batteries. Additionally, the electronic cabinets are heated by the sun, thus serving to further raise the temperature of the environment in which the batteries are operating. In most cases, a high heat environment shortens a battery's life. It is well known by those within the commercial battery industry that the effective life span of a battery is significantly diminished by extreme ambient temperatures.

In attempts to increase the effective life span of the batteries, prior art devices have been developed in which the batteries may be removed from the electronic cabinets. An example of such a device is an upright battery cabinet that may be placed next to the electronics cabinet. Upright cabinets and other prior art devices, however, take up additional space at the telecommunications, utility or other site. At many sites, space is at a premium, and the presence of separate battery enclosures crowds the site, making it more difficult for technicians to access the equipment housed in the electronic cabinets.

Additionally, even if an upright battery cabinet has a small footprint and does not take up a significant amount of space at the telecommunications, utility or other site, the expense and weight of the upright battery cabinet might make it impractical to use. An upright battery cabinet accommodates multiple batteries by arranging them on several vertical shelves. The vertical design requires the enclosure to be built with heavy bracing and metal to support the weight of the batteries. The bracing must be further reinforced if the battery cabinet is to be used in an area susceptible to seismic forces. As an upright battery cabinet gets taller, the moment arm when shaken gets larger and heavier metal and bracing is required. As heavier bracing and metal is needed, the expense of the upright battery cabinet increases. Additionally, the weight of the upright battery cabinet increases dramatically. The weight of some upright battery cabinets combined with the batteries housed inside the cabinet can exceed well over 400 pounds per square foot, which exceeds the capacity of most building rooftop designs, making use of the upright battery cabinet impracticable.

Accordingly, there exist a need in the art for an improved battery enclosure that houses batteries outside of an electronic cabinet.

SUMMARY OF THE INVENTION

According to one embodiment of the invention, there is disclosed an improved battery enclosure. The battery enclosure includes a bottom portion configured to house a battery array and a top portion configured to rest on the bottom portion and enclose the batter array. The top portion is at least partially supported by the battery array when a load is placed on the top portion of the battery enclosure.

According to an aspect of the present invention, a insulation material is disposed substantially between the battery array and the top portion of the battery enclosure. According to another aspect of the present invention, the insulation material comprises a sealed covered top insulation layer. According to another aspect of the present invention, an insulation material is disposed substantially between the battery array and the sides of the bottom portion of the battery enclosure.

According to yet another aspect of the present invention, the top portion of the battery enclosure includes one or more ventilation slits or vent holes in the side of top portion through which gases are permitted to escape. According to another aspect of the present invention, the one or more vent holes are disposed on one or more overhanging surfaces of the top portion.

According to yet another aspect of the present invention, the battery enclosure further includes a non-skid surface on the top of the top portion. According to another aspect of the present invention, the battery enclosure is made up of a light weight material such as aluminum or plastic.

According to another aspect of the present invention, the battery array housed within the battery enclosure is made up of a single layer of batteries. Alternatively, according to another aspect of the present invention, the battery array is made up of more than a single layer of batteries.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
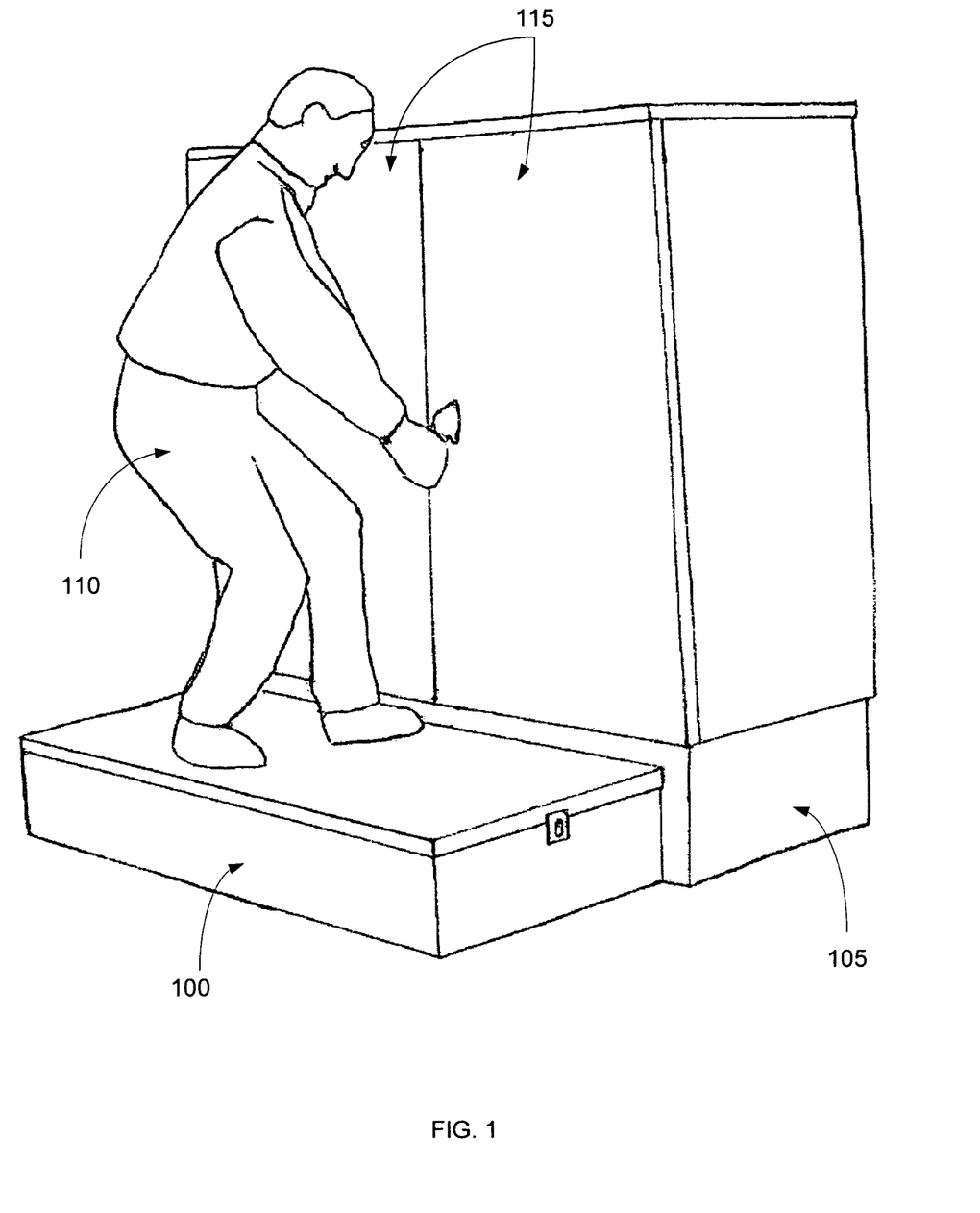
FIG. 1 shows an exemplary setup of the present invention at a telecommunications remote site according to an illustrative embodiment of the present invention.

FIG. 1 illustrates an exemplary setup of a battery enclosure 100 at a telecommunications remote site, according to an illustrative embodiment of the present invention. Although the present invention will be described in FIG. 1 as being implemented at a telecommunications remote site, it will be understood by those of ordinary skill in the art that the present invention may also be used at a utility switchgear site, wireless site, railroad site, or any other site in which an electronic cabinet located in an outdoor environment uses batteries as a primary or backup power source.

With reference to FIG. 1, the battery enclosure 100 may be located at or near an electronics cabinet 105 at the telecommunications remote site. The battery enclosure 100 may be located adjacent to the electronics cabinet 105 below the doors 115 of the electronics cabinet 105. In other words, when the doors 115 of the electronics cabinet 105 are opened, they may pass over the battery enclosure 100. The battery enclosure 100 may also be installed on the same concrete pad or other surface on which the electronics cabinet 105 is installed. It will be understood, however, that the battery enclosure 100 may be installed on a separate concrete pad or surface than the electronics cabinet 105. The battery enclosure 100 may also be installed on top of the electronics cabinet 105.

According to one aspect of the present invention, the battery enclosure 100 has a low profile and may serve as a step or work platform for a technician 110 working on the electronics cabinet 105 or the equipment housed within the electronics cabinet 105. The technician 110 may open the doors 115 of the electronics cabinet 105 and stand or sit on top of the battery enclosure 100 while working on the electronics cabinet 105 or the equipment housed within the electronics cabinet 105. Such a positioning and use of the battery enclosure 100 is advantageous because the battery enclosure 100 requires no additional site real estate than what would normally be required for an electronics cabinet 105. A work area needs to be maintained in front of an electronics cabinet 105 in order to allow a technician 110 to service the equipment stored inside the electronics cabinet 105. By doubling as a step and work surface, the battery enclosure 100 takes up no more site space than would normally be required to allow a technician 100 to access the electronics cabinet 105. A prior art upright battery enclosure requires additional site space other than the space reserved for access to the electronics cabinet 105 by a technician. The battery enclosure 100 of the present invention, however, is configured to take up essentially no additional site space.

In accordance with the present invention, batteries used to power the equipment inside the electronics cabinet 105 are removed from exposure to the heat generating equipment housed in the electronics cabinet 105. The battery enclosure 100 keeps the batteries relatively cool by removing them from the electronic heat generated by the equipment. Additionally, the battery enclosure 100 insulates the thermal mass of the batteries such that the maximum daily temperature of the batteries is less than the 24 hour average ambient temperature. In most cases, housing the batteries in the battery enclosure 100 rather than in the electronics cabinet 105 will preserve battery life, as a high heat environment may shorten the life of the batteries.

Figure 2:
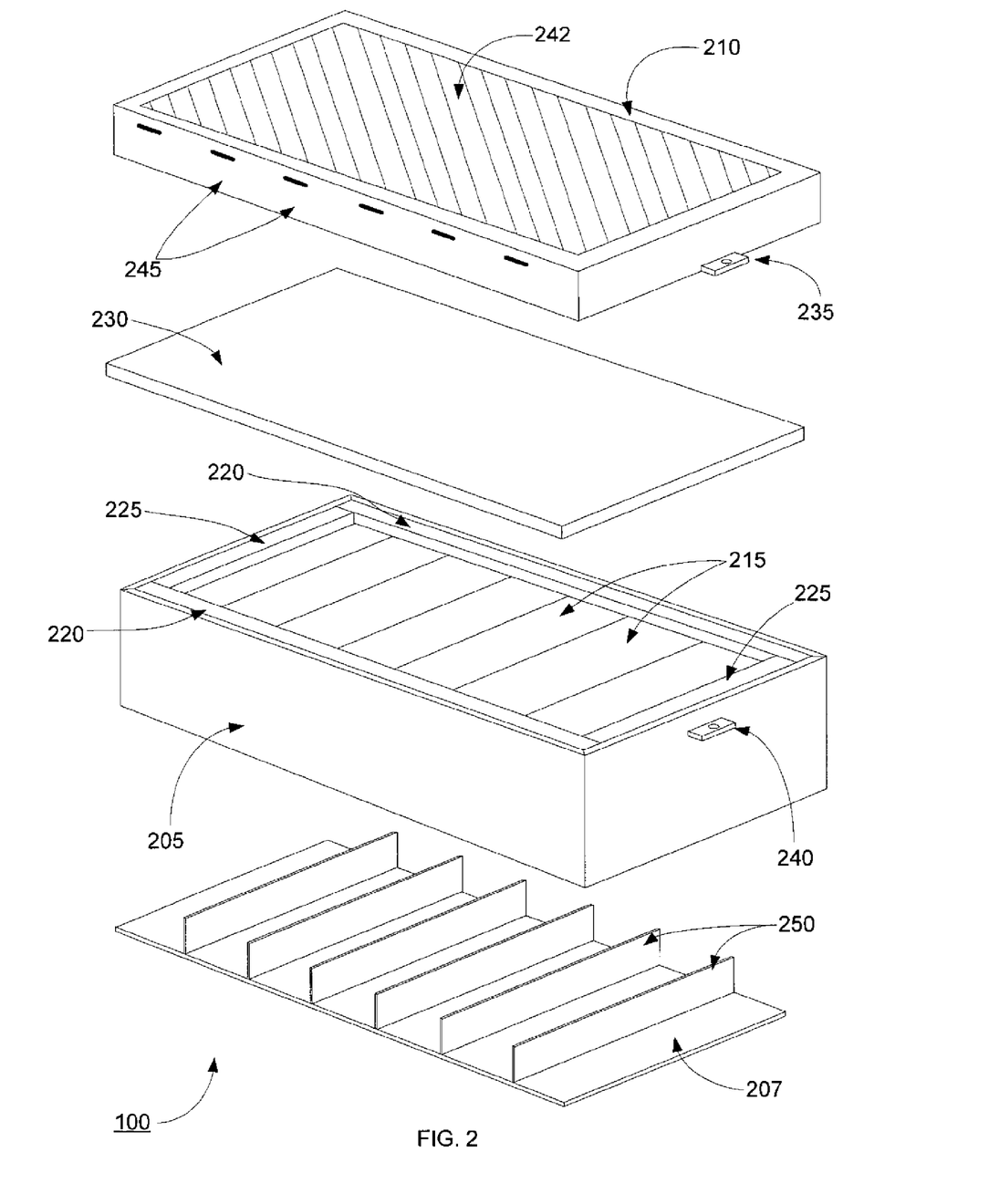
FIG. 2 shows a partially exploded perspective view of a low profile battery enclosure according to an illustrative embodiment of the present invention.

FIG. 2 shows a partially exploded perspective view of a battery enclosure 100 according to an illustrative embodiment of the present invention. The battery enclosure 100 may have a bottom portion 205 and a top portion 210 configured to rest on top of the bottom portion 205. One or more arrays of batteries 215 may be housed in the battery enclosure 100. The batteries 215 may be situated in the bottom portion 205 of the battery enclosure 100 on a floor plate 207. Insulation material 220, 225 may be disposed between the array of batteries 215 and the side surfaces of the bottom portion 205 of the battery enclosure 100. Length dimension insulation material 220 may be disposed between the batteries 215 and the sides of the bottom portion 205 of the battery enclosure 100 situated in the length dimension of the battery enclosure 100. Similarly, width dimension insulation material 225 may be disposed between the batteries 215 and the sides of the bottom portion 205 of the battery enclosure 100 situated in the width dimension of the battery enclosure 100. Additional insulation material 230 may be disposed on the top of the array of batteries 215 such that it is situated between the batteries and the top portion 210 of the battery enclosure 100. When the top portion 210 is resting on the bottom portion 205, locking tabs 235 on the top portion 210 may be aligned with locking tabs 240 on the bottom portion 205 in order to provide a mechanism for securing the array of batteries 215 within the battery enclosure 100, as discussed in greater detail below. Ventilation slits 245 may also be provided on the top portion 210 of the battery enclosure 100 in order to prevent dangerous gases such as explosive hydrogen gas from accumulating in the battery enclosure 100.

The battery enclosure 100 may have a footprint that is rectangular in shape; however, it will be understood by those of skill in the art that the footprint of the battery enclosure 100 may be virtually any shape, such as a square, oval, or circle. As shown in FIG. 2, when the battery enclosure 100 has a rectangular footprint, the bottom portion 205 of the battery enclosure 100 may contain a floor plate 207 with four sides extending upward from the floor plate 207. Accordingly, the bottom portion 205 of the battery enclosure 100 may form an area in which one or more batteries 215 may be situated. Alternatively, the four sides of the battery enclosure may each contain a horizontal member extending from the bottom of the side toward the center of the battery enclosure 100, and the four horizontal members may form a ridge on which a removable floor plate 207 rests.

According to an aspect of the present invention, one or more batteries 215 may be housed by the battery enclosure 100. The batteries 215 housed by the battery enclosure 100 may be formed into one or more arrays. Although only one array of batteries 215 is shown in FIG. 2, it will be understood by those skilled in the art that more than one battery array may be housed within the battery enclosure. For example, two battery arrays could be situated side-by-side in the battery enclosure 100. Additionally, a terminal (not shown) may be situated within the battery enclosure 100, and used to form connections between the batteries 215 and the equipment housed within an adjacent electronics cabinet 105. In the illustrative embodiment of FIG. 2, the terminal may be situated along one side of the battery array or along the top of the battery array. In the two battery array example, the terminal may be situated within the battery enclosure 100 between the two side-by-side battery arrays. The battery enclosure 100 may also include an opening for one or more power cables (not shown) to enter or exit the battery enclosure 100. One or more of the power cables may be used to provide power to the terminal or to charge the batteries 215 situated within the battery enclosure 100. Additionally, one or more power cables may be used to provide power from the batteries 215 to the equipment housed within an adjacent electronics cabinet 105. Alternatively, the battery enclosure 100 may include an electrical plug that may be connected to a power source in order to provide power to the terminal or to charge the batteries 215 housed within the battery enclosure 100. Similarly, a power line or electrical socket may be used to provide power from the batteries 215 to the equipment housed within the electronics cabinet 105. Other configurations of battery arrays and terminals will be readily apparent to those of ordinary skill in the art.

The battery enclosure 100 of the present invention may be made in many sizes depending on the particular application for which it is used. The required back-up power time at a remote site will largely determine the number and size of batteries 215 needed at the site and, therefore, may define the size of the battery enclosure 100. The length and width of the battery enclosure 100 may also be determined by the size of the electronics cabinet 105. In other words, for aesthetic reasons, the length and width of the battery enclosure 100 may be determined so that the battery enclosure 100 may match up to the electronics cabinet 105. In order to take up no additional site real estate, the height of the battery enclosure 100 should be lower than any doors 115 on the electronics cabinet 105. Accordingly, the required height of battery enclosure 100 may determine the number of layers of batteries 215 housed within the enclosure box 100. A desired height may also be maintained by choosing short batteries and increasing the number of battery arrays to achieve a required back-up power time. As shown in FIG. 2, a lower profile battery enclosure 100 may be obtained by limiting the arrays of batteries 215 in the battery enclosure 100 to one level. It will, however, be understood by those skilled in the art that battery arrays may be stacked on top of one another within the battery enclosure 100 as long as the overall height of the battery enclosure 100 is lower than the doors 115 of an adjacent electronics cabinet 105.

According to an aspect of the present invention, essentially all of the battery enclosure's 100 weight, as well as the weight of the batteries 215 housed in the battery enclosure 100, rests on the floor plate 207 of the battery enclosure 100. Due to the low profile of the battery enclosure 100, the floor plate 207 does not need to spread the weight of the battery enclosure 100 and batteries 215, as the weight is already spread by keeping the heavy batteries at essentially floor level. If the arrays of batteries 215 are limited to one level or tier, the floor loading may be kept relatively low. For example, the floor loading of a battery enclosure 100 which houses only one level of batteries 215 may be kept below 100 pounds per square foot. Such a low floor loading is beneficial for certain applications, such as an application on top of a building. The relatively low floor loading is beneficial because it ensures that the roof of the building will be able to support the weight of the battery enclosure 100 and the batteries 215 housed therein.

Once batteries are situated within the bottom portion 205 of the battery enclosure 100, the top portion 210 of the battery enclosure 100 may be placed on top of the bottom portion 205. When the top portion 210 is place on top of the bottom portion 205, the batteries 215 will be enclosed within the battery enclosure 100. As shown in FIG. 2, the top portion 210 may simply rest on top of the bottom portion 205 and the batteries 215 contained therein. Alternatively, the top portion 210 may be connected to the bottom portion 205 by hinges. Hinges may be used to connect the entire top portion 210 to the bottom portion 205 along one side of the top portion 210. Alternatively, the top portion 210 may contain multiple parts with each part connected to the bottom portion 205 with hinges. For example, the top portion 210 may include two parts hinged on the outside edge and closing toward the center of the battery enclosure 100.

Additionally, a locking mechanism may be used to secure the top portion 210 to the bottom portion 205. As shown in FIG. 2, locking tabs 235 on the top portion 210 may be aligned with locking tabs 240 on the bottom portion. Each of these locking tabs 235, 240 may contain a hole or slit to accommodate a pad lock or other locking mechanism. Although locking tabs 235, 240 are shown in FIG. 2, it will be understood by those of ordinary skill in the art that other locking mechanisms may be used in accordance with the present invention. A suitable locking mechanism is any device capable of securing the top portion 210 to the bottom portion 205 including, but not limited to, tabs, buckles, and hinged fasteners. The top portion 210 of the battery enclosure 100 may also include handles or grips (not shown) that may be used to move the top portion 210 and that may be used to move the entire battery enclosure 100 if the top portion 210 is secured to the bottom portion 205. The bottom portion 205 may also include handles or grips for moving the battery enclosure 100.

As previously mentioned, the battery enclosure 100 may be placed adjacent to an electronics cabinet 105 below the doors 115 of the electronics cabinet 105. A technician 110 performing maintenance on the electronics cabinet 105 may use the battery enclosure 100 as a step or work platform while working on the electronics cabinet 105 or the equipment housed within the electronics cabinet 105. Accordingly, the battery enclosure 100 takes up essentially no additional space at the remote site, but instead uses the space that is there by providing a raised workspace floor for a technician 105. As explained in greater detail below, the work space provided by the battery enclosure 100 may support the weight of several technicians 110 that weigh in excess of 300 pounds. Although a benefit of the present invention is that it takes up essentially no additional space when placed below the doors 115 of the electronics cabinet 105, the battery enclosure 100 does not have to be located below the doors 115 of the electronics cabinet 105. If desired, the battery enclosure 100 may be located to the side or rear of the electronic cabinet 105.

Although it is designed to house heavy batteries 215 and may be used as a work platform by several heavy technicians 110, the battery enclosure 100 of the present invention may be constructed out of light weight material. For example, the battery enclosure 100 may be constructed out of very thin gauge metal such as aluminum or it may be constructed out of plastic. Such light weight materials may be used to construct the battery enclosure 100 because the battery enclosure 100 alone does not have to support the full load of the technicians 110 or any items placed on top of the battery enclosure 100. In accordance with an aspect of the present invention, the batteries 215 housed within the battery enclosure 100 are utilized to support a substantial portion if not all of a load placed on top of the battery enclosure 100. In other words, the top portion 210 of the battery enclosure 100 may at least partially rest on the batteries 215, although it will be understood that a layer of insulation material 230 may be disposed between the batteries 215 and the top portion 210 of the battery enclosure 100. Therefore, the major loads on top of the battery enclosure 100 (such as technicians, their tools, and equipment) are at least partially supported by the batteries 215 themselves as if the load was resting directly on top of the batteries 215. The top portion 210 of the battery enclosure 100 and the insulation material 230 may function to distribute the weight of a load on the top of the battery enclosure 100. In a typical installation, the pressure on the tops of the batteries 215 may be less than 1.5 pounds per square inch.

The battery enclosure 100 may be constructed out of materials that are resistant to corrosion. If corrosion resistant materials are used, the battery enclosure 100 will not require expensive plating or painting. Suitable materials for construction may include aluminum or plastic. If plastic is used to construct the battery enclosure 100, a flame retardant plastic may be used or, alternatively, a flame retarding coating may be applied to the plastic. Acid resistant plastic may also be used to prevent any damage caused by a battery leak. If aluminum is used to construct the battery enclosure 100, the thickness of the aluminum may be very small. For example, the aluminum thickness may be as little as approximately 1/16 inches. Additionally, the battery enclosure 100 may be light in color to reflect sunlight so as to not absorb sunlight heat. By reflecting sunlight, a lower temperature may be maintained inside the battery enclosure 100, which may extend the field life of the batteries 215 housed therein.

According to an aspect of the present invention, the top of the top portion 210 may be coated in a non-skid surface 242 to allow for traction when the top is wet. A non-skid surface 242 such as a paint on epoxy may be applied to the top portion 210 of the battery enclosure 100. Alternatively, the top portion 210 of the battery enclosure 100 may have a non-skid surface 242 incorporated into its top surface. For example, grooves may be molded or etched into the top portion 210 to provide a non-skid surface 242. Alternatively, raised portions or buttons may be molded into or formed on the top portion 210 to provide a non-skid surface 242. It will be understood by those of skill in the art that many other types of non-skid surfaces may be incorporated into the top surface of the top portion 210 in order to provide traction on top of the battery enclosure 100. The top of the top portion 210 may also be designed to have a slope or grade to assist in the displacement of water and debris from the top of the battery enclosure 100. Additionally, one or both of the top portion 205 and bottom portion 210 may be designed to be waterproof.

According to an aspect of the present invention, the top portion 210 of the battery enclosure 100 may include ventilation slits 245 or holes to prevent dangerous gas from accumulating in the battery enclosure 100. Vented batteries, which may be housed in the battery enclosure 100, produce explosive hydrogen gas when they are charging. This hydrogen gas will accumulate in the top section of any enclosure. A method for determining where the hydrogen gas or other gases will accumulate would be to turn an enclosure upside down and fill it with water. If water pools in the enclosure to any depth greater than its surface tension, a gas such as hydrogen will pool there. The battery enclosure 100 of the present invention allows for any dangerous gases to be vented through the ventilation slits 245 on the top portion 210.

Figure 3:
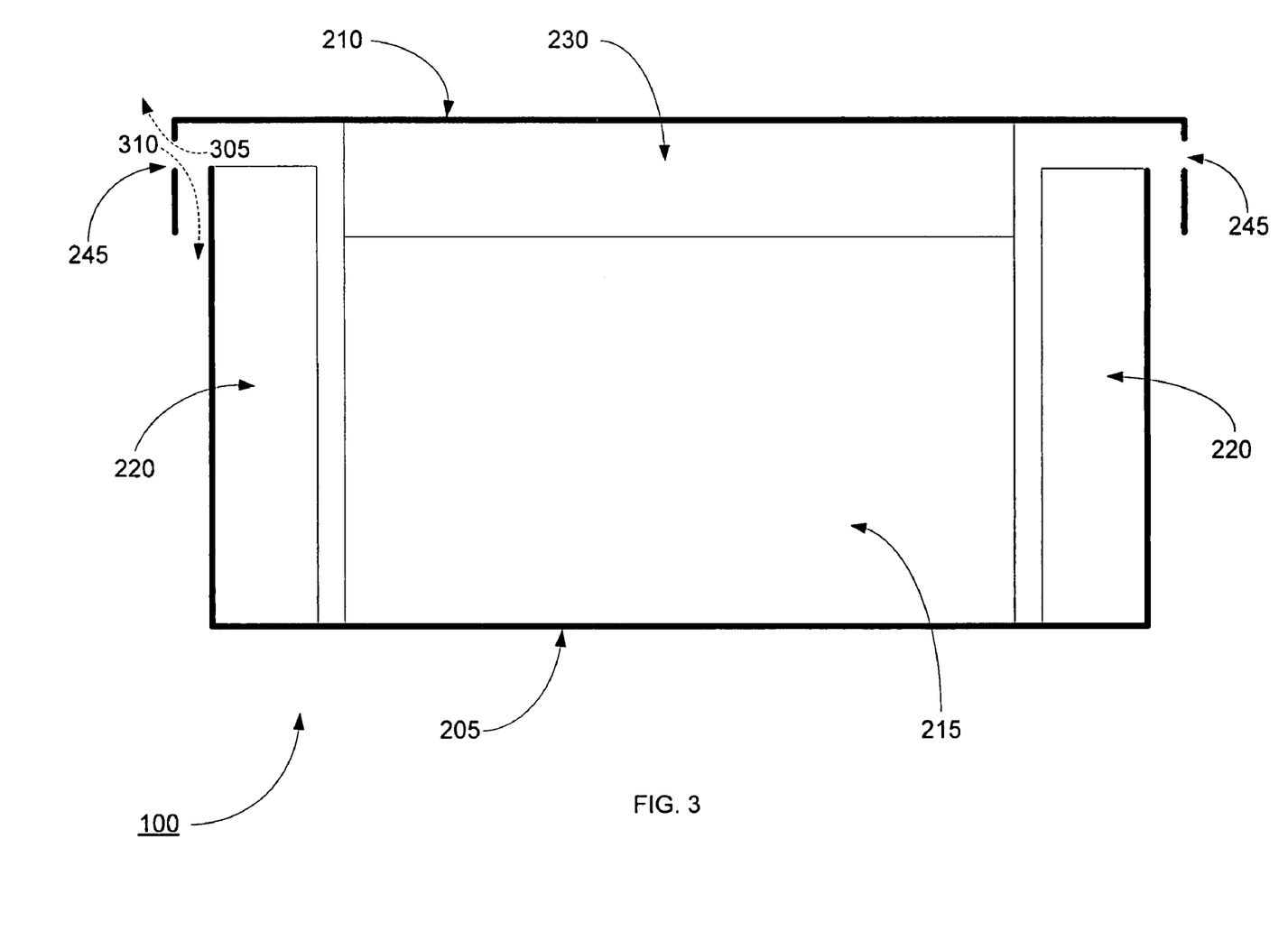
FIG. 3 shows a cross-sectional view of a low profile battery enclosure according to an illustrative embodiment of the present invention.

FIG. 3 shows a cross-sectional view of a low profile battery enclosure 100 according to an illustrative embodiment of the present invention. As shown in FIG. 3, the ventilation slits 245 may be situated on the sides of the top portion 210. The sides of the top portion 210 extend downwardly from the top surface of the top portion 210 and may be designed to form an overhang when the top portion 210 rests on the bottom portion 205 of the battery enclosure 100. The sides of the top portion 210 may further stabilize the top portion 210 of the battery enclosure 100. By positioning the ventilation slits 245 on the sides of the top portion 210, rainwater and other debris that enter the ventilation slit 245 will not be permitted to enter the battery enclosure 100; however dangerous gases such as hydrogen are still allowed to escape the battery enclosure 100 through the ventilation slits 245. As shown at point 305 of FIG. 3, any hydrogen gas vented by the batteries 215 will drift upward in the space between the batteries 205 and the length dimension insulation material 220 and be expelled through the ventilation slits 245. Additionally, as shown at point 310, any rainwater or debris that enters the ventilation slit 245 will run down the inside edge of the overhang of the top portion 210 and fall or drip out of the battery enclosure 100.

The ventilation slits 245 of the battery enclosure 100 may be sized large enough to keep dust and debris from clogging the openings of the ventilation slits 245, but small enough to allow water drops to pass over the ventilation slits 245 and prevent animals and/or insects from entering to make nests in the ventilation slits 245 or the battery enclosure 100. For example, a suitable size for the ventilation slits 245 may be between approximately 2 and 4 millimeters in width and approximately 25 millimeters in length. The ventilation slits 245 may also be spaced along any number of the sides of the top portion 210 of the battery enclosure 100. Advantageously, if ventilation slits 245 are spaced along all four sides of the top portion 210, the highest space inside the battery enclosure 100 will be effectively vented in situations where the ground, floor, or concrete pad on which the battery enclosure 100 rests is not perfectly level.

In order to extend the field life of batteries 215 housed within the battery enclosure 100, the battery enclosure 100 may be insulated. As shown in FIGS. 2 and 3, insulation material 220, 225, 230 may be disposed between the batteries 215 and the surfaces of the battery enclosure 100. Length dimension insulation material 220 may be disposed between the batteries 215 and the sides of the bottom portion 205 situated in the length dimension of the battery enclosure 100. Similarly, width dimension insulation material 225 may be disposed between the batteries 215 and the sides of the bottom portion 205 situated in the width dimension of the battery enclosure 100. Additional top insulation material 230 may be disposed on the top of the array of batteries 215 such that it is situated between the batteries and the top portion 210 of the battery enclosure 100.

The insulation layers 220, 225, 230 may include flame retardant insulation. The thickness of the insulation layers 220, 225, 230 may be approximately 2 inches thick, although other thicknesses may be used. A suitable insulation material for the insulation layers 220, 225, 230 may include Dow Thermax Sheathing. The insulation layers 220, 225, 230 may keep the batteries 215 at or below the 24 hour average temperature. Day time high temperature typically last for a much shorter period of time than night time lows, although the difference between the two temperatures may be rather large. Typically, the 24 hour average temperature is close to approximately 30% of the difference between the day time high and the night time low added to the night time low temperature. For example, if the day time high is 40° C. and the night time low is 10° C., the 24 hour average temperature may be close to 19° C. The insulation layers 220, 225, 230 of the present invention will help maintain the temperature inside the battery enclosure 100 at or near the cooler 24 hour average temperature, thus extending the field life of the batteries 215.

Additionally, one or more of the insulation layers 220, 225, 230 may be enclosed within a sealed cover to discourage or prevent the insulation layers 220, 225, 230 from absorbing or soaking up hydrogen gas. The sealed covers used to enclose one or more of the insulation layers 220, 225, 230 may be made of foil. By preventing hydrogen and other gases from being absorbed by the insulation layers 220, 225, 230, the gases will be more rapidly expelled from the battery enclosure 100 through the ventilation slits 245.

A support structure or frame may also be disposed between the top of the batteries 215 and the top portion 210 of the battery enclosure 100. The support structure may be incorporated into the top insulation layer 230 or it may be separate from the top insulation layer 230. The support structure may be disposed within the same plane as the top insulation layer 230 or it may be disposed in a plane parallel to the top insulation layer 230. The support structure may provide additional support to the top portion 210 and any load supported by the top portion 210. Additionally, if the top insulation layer 230 is formed from a material that is compressible when a load is placed on top of it, the support structure may help to ensure that a sufficient spacing is maintained between the bottom portion 205 and top portion 210 to allow hydrogen and other gases to escape through the ventilation slits 245, as shown in FIG. 3. The support structure may include a boxed frame structure or, alternatively, it may include a structure with additional support members extended from the outer frame of the support structure, such as a lattice-like structure or other structure as will be understood by those skilled in the art. If the support structure is integrated with the top insulation layer 230, the top insulation layer 230 may include more than one section of insulation material in order to fit the dimensions of the support structure. The support structure may be made of a light weight material such as plastic or a thin gauge metal. Additionally, if the support structure is disposed in a separate plane than the top insulation material 230, the bottom edge of the support structure may include grooves or channels in order to allow air to flow over the top of the batteries 215 housed within the battery enclosure 100.

An electrically isolating layer may also be disposed between the tops of the batteries 215 and the top portion 210 of the battery enclosure 100. The electrically isolating layer may be incorporated into the top insulation layer 230 or, alternatively, it may be a separate layer than the top insulation layer 230. The electrically isolating layer may separate the tops of the batteries 215 from the insulation contained in the top insulation layer 230, and it may also separate the tops of the batteries 215 from the top portion 210 of the battery enclosure 100. The electrically isolating layer may be used to prevent a short circuit if the terminals (not shown) on top of the batteries 215 become exposed. Some insulation material, including some flame retardant insulation material that may be used in the top insulation layer 230, contains a foil sheathing on both sides. This foil sheathing may short the batteries 215 if the terminals on top of the batteries 215 are exposed. Accordingly, the electrically isolating layer may prevent a short by preventing a contact between an exposed battery terminal and a conductive layer such as the foil sheathing. The electrically isolating layer may be layer of virtually any non-conductive material. For example, the electrically isolating layer may be formed of rubber or plastic. The electrically isolating layer may be disposed between the batteries 215 and the top insulation layer 230 or it may be incorporated into the top insulation layer 230. For example, the electrically isolating layer may be affixed to the bottom of the top insulation layer 230 or the top insulation layer 230 may be partially or completely enclosed in the electrically isolating layer.

The battery enclosure 100 of the present invention will keep the batteries 215 cooler than if they were in the electronics cabinet 105 where heat is generated by electronic equipment and kept internal by insulation. The typical electronics cabinet 105 is also a sun heat absorber, which serves to further raise the temperature inside the electronics cabinet 105. Most outdoor non-air conditioned electronics cabinets 105 average an internal temperature of over 40° C. with peak temperatures of over 55° C. The life of battery is halved for every 10° C. temperature rise above 25° C. By placing the batteries in the battery enclosure 100 of the present invention, the temperature that the batteries are stored in may be maintained at a point below 25° C., which may serve to effectively double the battery field life.

Additionally, the heavy thermal mass of the batteries 215 housed in the battery enclosure 100 may be cooled by direct convection through the floor plate 207 of the battery enclosure 100, which at least in part acts as a heat sink. The floor plate 207 may be constructed of a very thin material such as 1/16 inch thick aluminum or a thin plastic. The batteries 215 will be cooled by convection through the floor plate 207 to the thermal sink of the earth, concrete floor, concrete pad, or other surface on which the battery enclosure 100 rests. As shown in FIG. 2, one or more cooling fins 250 may optionally be included and configured, for example, to extend upward from the floor plate 207 into the battery enclosure 100 to help transfer the cooling effect inside the battery enclosure 100. Alternatively, the cooling fins 250 may be integrated into the bottom portion 205 of the battery enclosure 100. These cooling fins 250 may especially be desirable if more than one level of batteries is housed within the battery enclosure 100.

In cold environments or during the cold months of the year, the temperature in the battery enclosure 100 may drop below a desired operating temperature. For example, a desired operating temperature for the batteries 215 may be between approximately 15° C. and 25° C. According to an aspect of the present invention, a heater (not shown) may be disposed within the battery enclosure 100 to keep the operating temperature of the batteries 215 above a minimum threshold value. For example, the heater may keep the batteries 215 above 15° C. It will be understood that any minimum threshold temperature value may be used in accordance with the present invention and that 15° C. was only used as a representative example.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A work platform, comprising:
   a bottom portion configured to house an array of multi-celled batteries that provide power to equipment stored inside an electronics cabinet proximate to the work platform;
   at least one power cable configured to provide power from the array of batteries to the equipment stored inside the electronics cabinet;
   an opening for the at least one power cable to extend from the work platform to the equipment;
   a top portion removably attached to the bottom portion and that forms a work platform surface on which at least two persons can rest, wherein the top portion and the at least two persons are at least partially supported by the array of batteries disposed in the bottom portion, and wherein the work platform alone does not support the top portion and the at least two persons when the array of batteries is not housed within the bottom portion;
   a sealed cover insulation material disposed substantially between the array of batteries and the top portion; and
   an electrically isolating layer disposed between the array of batteries and the sealed cover insulation material.

2. The work platform of claim 1, wherein the sealed cover insulation material comprises a thermax sheathing insulation material.

3. The work platform of claim 1, wherein the top portion includes one or more vent holes in the side of the top portion through which gases are permitted to escape.

4. The work platform of claim 3, wherein the top surface includes one or more overhanging surfaces, and wherein the one or more vent holes are disposed on the one or more overhanging surfaces of the top portion.

5. The work platform of claim 1, wherein an insulating material is disposed substantially between the array of batteries and the sides of the bottom portion.

6. The work platform of claim 1, further comprising a non-skid surface on the top surface of the top portion, wherein the non-skid surface comprises a paint or epoxy that is applied to the ton surface of the top portion.

7. The work platform of claim 1, further comprising a non-skid surface on the top surface of the top portion, wherein the non-skid surface comprises at least one of (i) a plurality of grooves formed into the top portion or (ii) a plurality of raised portions formed into the top portion.

8. The work platform of claim 1, wherein the array of batteries comprises a plurality of layers of batteries.

9. The work platform of claim 1, wherein the work platform is comprised of aluminum or plastic.

10. The work platform of claim 1, further comprising:
one or more cooling fins extending upwardly from the bottom of the bottom portion and operable to transfer heat from the array of batteries.

* * * * *

UNITED STATES PATENT AND TRADEMARK OFFICE
CERTIFICATE OF CORRECTION

PATENT NO. : 7,709,138 B2
APPLICATION NO. : 11/472173
DATED : May 4, 2010
INVENTOR(S) : David J. Flaugher It is certified that error appears in the above-identified patent and that said Letters Patent is hereby corrected as shown below:

At column 11, line 15, delete "ton" and insert --top--.

Signed and Sealed this

Fifteenth Day of June, 2010

David J. Kappos
*Director of the United States Patent and Trademark Office*